United States Patent

Ringdal et al.

[11] Patent Number: 5,888,382
[45] Date of Patent: Mar. 30, 1999

[54] FILTRATION TANK AND MEANS FOR SUBSEQUENT PURIFICATION OF WASTE WATER

[75] Inventors: Lars Ringdal, Oslo; Lars Westlie; Jens Christian Køler, both of Ås, all of Norway

[73] Assignee: Bakelittfabrikken A/S, Oslo, Norway

[21] Appl. No.: 860,367

[22] PCT Filed: Dec. 21, 1995

[86] PCT No.: PCT/NO95/00240

§ 371 Date: Aug. 25, 1997

§ 102(e) Date: Aug. 25, 1997

[87] PCT Pub. No.: WO96/20134

PCT Pub. Date: Jul. 4, 1996

[30] Foreign Application Priority Data

Dec. 27, 1994 [NO] Norway ..................................... 945040

[51] Int. Cl.⁶ .................................................. C02F 1/32
[52] U.S. Cl. .......................... 210/104; 210/117; 210/203; 210/205; 210/258; 210/262; 210/266; 210/282; 210/290
[58] Field of Search .................................. 210/104, 117, 210/232, 244, 246, 248, 256, 257.1, 258, 150, 151, 262, 266, 282, 290, 748, 198.1, 203, 205

[56] References Cited

U.S. PATENT DOCUMENTS

| | | | |
|---|---|---|---|
| 3,528,549 | 9/1970 | Ray | 210/151 |
| 4,100,073 | 7/1978 | Hopcroft | 210/532 |
| 4,895,645 | 1/1990 | Zorich, Jr. | 210/98 |
| 5,096,596 | 3/1992 | Hellenbrand et al. | 210/721 |
| 5,108,614 | 4/1992 | Ross et al. | 210/665 |
| 5,217,607 | 6/1993 | Dalton, III et al. | 210/143 |
| 5,266,215 | 11/1993 | Engelhard | 210/748 |
| 5,288,412 | 2/1994 | Voorhees et al. | 210/739 |
| 5,352,357 | 10/1994 | Perry | 210/150 |

FOREIGN PATENT DOCUMENTS

| | | | |
|---|---|---|---|
| 0 382 579 | 10/1993 | European Pat. Off. | |
| 0 530 672 | 12/1996 | European Pat. Off. | |
| 3828026 | 8/1988 | Germany | 210/748 |
| 3536691 | 4/1997 | Germany | |
| 40-5064783 | 3/1993 | Japan | 210/748 |
| 1333585 | 10/1970 | United Kingdom | |

*Primary Examiner*—Peter A. Hruskoci
*Attorney, Agent, or Firm*—Townsend and Townsend and Crew

[57] ABSTRACT

A filtration tank and means for subsequent purification of filter bag purified waste water, especially grey water, which is introduced into the top of a filter tank and is evenly distributed by means of spray nozzles on the top layer of purification media, which are built up in layers in a tank around a built-in central pipe. The layers of purification media consist of varying types of material and grain size, density, weight, ect. The water passes through the varying layers of purification medium and is collected on the bottom of the central pipe, where a pump lifts the water through a U.V. treatment apparatus for sanitation.

8 Claims, 1 Drawing Sheet

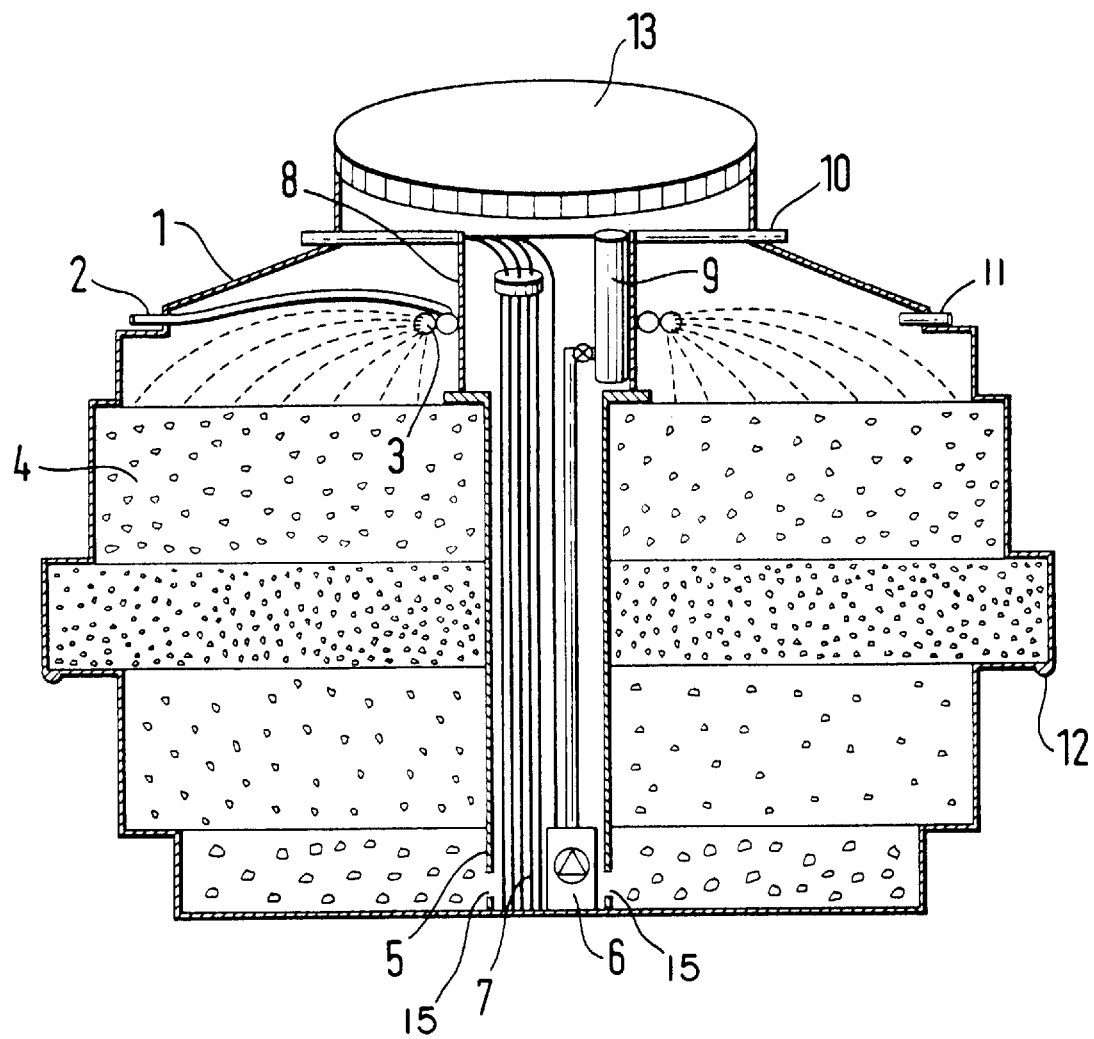

FILTRATION TANK AND MEANS FOR SUBSEQUENT PURIFICATION OF WASTE WATER

CROSS REFERENCE TO RELATED APPLICATIONS

This invention concerns a special subsequent purification of water which has undergone a pretreatment through filter bags/sacks.

It is known that purification of waste water such as grey and black water can be performed in places where the local earth masses satisfy the requirements of the authorities.

Houses and especially cabins are often situated in areas where the discharge of waste water into local earth masses cannot be permitted. The majority of existing cabins in this country are built in such areas.

The invention therefore comprises a special purification method which takes place inside a large container, which is constructed with a central pipe around which are built up in layers various types of purification media which vary in grain size, weight and purification capacity, etc.

The water purified by the filter bag technique is introduced into the top of the large container and is evenly distributed by means of spray nozzles over the top layer of the added purification medium.

The water undergoes a mechanical, chemical and biological purification in several layers of built-up purification media and is collected on the bottom of the container, where a slightly more coarse-grained purification medium is preferably added.

The water is then passed under or through perforations in the said central pipe in which there is inserted a pump which lifts the now purified water up for further treatment in a U.V. treatment apparatus for sanitation before it continues for re-use in, e.g., water closets or it can be employed for watering purposes in gardens, market gardens and agriculture. Any surplus purified water can also be conveyed to an arrangement for discharge into the ground.

The top part of the central pipe is a removable pipe part, where the U.V. treatment apparatus is installed, preferably together with pipes down to the water pump which thus remains near the bottom of the container.

The container is preferably provided with gradations whose diameter increases down towards the middle. In the lower edge of the central area there is provided a gripping section for handling the container. The lower part is then provided with gradually decreasing diameter down towards the bottom. The tank with the described shape can withstand high external pressure and is therefore well suited for burial in the ground.

The invention will be of great importance, especially in areas of scattered housing where purification according to present day guidelines cannot be recommended. The invention will further be of relevance where it will be too expensive to lay pipelines up to municipal drainage networks. In addition to this the invention can reduce water consumption by 20–30% due to the fact that the purified water is used as flushing water in water closets. The savings increase further if the water is used for watering during the summer months. This is the critical time with the greatest consumption of water, and in the summer time the savings can be as high as 50%.

The invention can be implemented in several variants and the attached drawing illustrates an embodiment in which the numeral 1 in the drawing indicates the actual container. 2 indicates the feed-in pipe for water which has undergone a first purification process with separation of solid and liquid particles. The water passes to distribution nozzles 3 where it is sprayed and distributed evenly over the uppermost filter medium 4. From there the water is purified through several layers of filtration masses of varying types to the bottom of the container 1, where it is collected in the bottom of a central pipe 5 through opening 15. In the central pipe there is inserted a pump 6. This transfers the purified water to a U.V. treatment unit 9 including a U.V. lamp where the water is sanitated. In the central pipe 5 there are introduced cables from relays and connection boxes to level sensors 7. At the top in a preferably removable part 8 of the central pipe there is installed a U.V. radiation unit 9 with outlet pipe and tap 10 for sampling of the purified water and a check valve installed in order that the U.V. lamp should always be located in water. 11 indicates an overflow pipe in case of failure of the pump or the power supply. 12 indicates a handling grip fashioned in the container 1. 13 indicates insulating blocks installed in the opening at the top of the container before the lid is fitted on.

We claim:

1. A filtration tank for subsequent purification and U.V. treatment of waste water, which has undergone a first purification with separation of solid particles through a filter bag purification technique, which tank comprises several layers of filtering masses of varying types, grain sizes, density and weight through which the waste water is transported and thereby purified, characterized in that the tank is provided with a central pipe, that the layers of filtering masses in the tank are provided around the central pipe, that an inlet pipe is positioned at the upper part of the tank to lead waste water from the first purification and into the tank, wherein the inlet pipe is provided with spray nozzles which are evenly distributed at the top of the tank above an upper layer of the layers of filter masses such that waste water entering the tank through the inlet pipe passes directly onto the upper layer of the layers of filtering masses, that the central pipe is in communication with a bottom layer of the filter masses and contains a pump and that a U.V. treatment device is positioned near an outlet from the tank such that substantially all of the waste water sprayed onto the upper layer passes directly through the layers of filtering masses, into the central pipe, and directly into the U.V. treatment device.

2. A filtration tank according to claim 1, characterized in that the tank has graduated outer dimensions with the largest dimension in the middle area, the steps of the graduation corresponding to the height of the respective layers of filtering masses in the tank.

3. A filtration tank according to claim 2, wherein the middle area includes a lifting/handling grip.

4. A filtration tank according to claim 1, characterized in that in the central pipe comprises a vertical pipe with built-in sensors for level control of the water level and the pump.

5. A filtration tank according to claim 1, characterized in that the U.V. treatment device for disinfection is positioned vertically, and that a check valve is installed in order that a U.V. lamp of the treatment device should always be located in water.

6. A filtration tank according to claim 1, characterized in that the central pipe in the middle of the tank has an extended area at the top which is removable.

7. A filtration tank according to claim 1, characterized in that the tank has a narrowed opening diameter at the top with a lid, and a thick coating of insulation applied in the opening.

8. A filtration tank for purification and U.V. treatment of waste water, comprising:

a tank body;

several layers of filtering masses held within the tank body and through which the waste water is transported, wherein the layers are configured to mechanically, chemically and biologically purify the waste water;

a central pipe disposed within the tank body, wherein the layers of filtering masses are arranged around the central pipe, and wherein the central pipe is in communication with a bottom layer of the layers of filtering masses;

an inlet pipe extending into the tank body such that the inlet pipe is positioned above an upper layer of the layers of filtering masses to transfer the waste water onto the layers of filtering masses, wherein the inlet pipe is provided with a plurality of spray nozzles which are evenly distributed over the upper layer such that waste water entering the tank through the inlet pipe passes directly onto the upper layer of the layers of filtering masses;

a pump disposed in the central pipe; and a U.V. treatment device positioned near an outlet from the tank;

wherein substantially all of the waste water sprayed onto the upper layer passes directly through the layers of filtering material, into the central pipe, and directly into the U.V. treatment device.

\* \* \* \* \*